(12) United States Patent
Okazaki et al.

(10) Patent No.: US 11,517,856 B2
(45) Date of Patent: Dec. 6, 2022

(54) FLOW PATH SPACER AND SPIRAL MEMBRANE ELEMENT

(71) Applicant: NITTO DENKO CORPORATION, Ibaraki (JP)

(72) Inventors: Yuha Okazaki, Osaka (JP); Yasuhiro Uda, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 146 days.

(21) Appl. No.: 17/055,390

(22) PCT Filed: Apr. 23, 2019

(86) PCT No.: PCT/JP2019/017247
§ 371 (c)(1),
(2) Date: Nov. 13, 2020

(87) PCT Pub. No.: WO2019/220885
PCT Pub. Date: Nov. 21, 2019

(65) Prior Publication Data
US 2021/0213390 A1 Jul. 15, 2021

(30) Foreign Application Priority Data

May 18, 2018 (JP) .............................. JP2018-096524

(51) Int. Cl.
*B01D 63/10* (2006.01)
*B01D 65/08* (2006.01)
*C02F 1/44* (2006.01)

(52) U.S. Cl.
CPC ........ *B01D 63/10* (2013.01); *B01D 2313/143* (2013.01); *B01D 2321/2008* (2013.01)

(58) Field of Classification Search
CPC .............. B01D 63/10; B01D 2313/143; B01D 2321/2008; B01D 65/08; B01D 2313/14; B01D 2313/146; C02F 1/44
See application file for complete search history.

(56) References Cited

U.S. PATENT DOCUMENTS

| 2013/0341264 A1 | 12/2013 | Kidwell |
| 2016/0151745 A1 | 6/2016 | Karabelas et al. |
| 2020/0164315 A1 | 5/2020 | Okazaki et al. |

FOREIGN PATENT DOCUMENTS

| JP | 2000237554 | 9/2000 |
| JP | 2004089763 | 3/2004 |

(Continued)

OTHER PUBLICATIONS

English language machine translation of JP2004089763A, 17 Pages, No Date.*

(Continued)

*Primary Examiner* — Pranav N Patel
(74) *Attorney, Agent, or Firm* — Hamre, Schumann, Mueller & Larson, P.C.

(57) ABSTRACT

A flow path spacer (13) of the present disclosure includes a plurality of first linear portions (21) and a plurality of second linear portions (22). There are a first pair (P1), a second pair (P2), and a third pair (P3), the first pair (P1) is at least one selected from a pair of the first linear portions (21) adjacent to each other and disposed at a first interval (W1) and a pair of the second linear portions (22) adjacent to each other and disposed at a first interval (W1), the second pair (P2) is at least one selected from a pair of the first linear portions (21) adjacent to each other and disposed at a second interval (W2) narrower than the first interval (W1) and a pair of the second linear portions (22) adjacent to each other and disposed at a second interval (W2) narrower than the first interval (W1), and the third pair (P3) is at least one selected (Continued)

from a pair of the first linear portions (21) adjacent to each other and disposed at a third interval (W3) narrower than the second interval (W2) and a pair of the second linear portions (22) adjacent to each other and disposed at a third interval (W3) narrower than the second interval (W2).

17 Claims, 10 Drawing Sheets

(56) References Cited

FOREIGN PATENT DOCUMENTS

| | | |
|---|---|---|
| JP | 2005305422 | 11/2005 |
| JP | 2009028714 | 2/2009 |
| JP | 2015526282 | 9/2015 |
| JP | 2018086642 | 6/2018 |

OTHER PUBLICATIONS

English language machine translation of JP2015526282A, 10 Pages, No Date.*

International Search Report and Written Opinion issued for International Patent Application No. PCT/JP2019/017247, dated Jul. 2, 2019, 11 pages including English translation of Search Report.

* cited by examiner

FLOW PATH SPACER AND SPIRAL MEMBRANE ELEMENT

TECHNICAL FIELD

The present invention relates to a flow path spacer and a spiral membrane element.

BACKGROUND ART

Spiral membrane elements, for example, are used for water treatment such as desalination of seawater and production of pure water. A spiral membrane element includes a water collection tube and a plurality of separation membranes wound around the water collection tube. To ensure a flow path of raw water to be treated, a raw water flow path spacer having a mesh structure is placed between the separation membranes adjacent to each other.

Patent Literature 1 describes a raw water flow path spacer including parallel strings placed along the flow direction of raw water and cross strings placed along a direction intersecting with the flow direction of raw water. According to Patent Literature 1, the cross strings thinner than the parallel strings allow a reduction in pressure loss in a raw water flow path.

CITATION LIST

Patent Literature

Patent Literature 1: JP 2005-305422 A

SUMMARY OF INVENTION

Technical Problem

Flow path spacers are required not only to be capable of achieving a low pressure loss but also to have an ability to reduce formation of a concentration polarization layer. A concentration polarization layer is a layer having a high concentration of a solute, such as ions and salts, that cannot permeate a separation membrane and is formed by accumulation of such a solute in the vicinity of the surface of a separation membrane. A concentration polarization layer increases an osmotic pressure in the vicinity of the surface of a separation membrane and decreases the amount of permeated water.

How likely a concentration polarization layer is to be formed can be expressed by the magnitude of shear stress acting on a separation membrane. The higher shear stress acting on a separation membrane is, the more likely a solute is to be washed away from the vicinity of the surface of the separation membrane. That is, the less likely a concentration polarization layer is to be formed.

However, shear stress and pressure loss are essentially in a trade-off relationship, and it is difficult to achieve both of them at the same time. The present disclosure provides a flow path spacer having a good balance between shear stress and pressure loss and a spiral membrane element including the flow path spacer.

Solution to Problem

The present disclosure provides a flow path spacer used between separation membranes wounded around a liquid collection tube of a spiral membrane element, the flow path spacer including:

a plurality of first linear portions each extending in a first direction; and a plurality of second linear portions each extending in a second direction inclined with respect to the first direction, wherein there are a first pair, a second pair, and a third pair, the first pair is at least one selected from a pair of the first linear portions adjacent to each other and disposed at a first interval and a pair of the second linear portions adjacent to each other and disposed at a first interval, the second pair is at least one selected from a pair of the first linear portions adjacent to each other and disposed at a second interval narrower than the first interval and a pair of the second linear portions adjacent to each other and disposed at a second interval narrower than the first interval, and the third pair is at least one selected from a pair of the first linear portions adjacent to each other and disposed at a third interval narrower than the second interval and a pair of the second linear portions adjacent to each other and disposed at a third interval narrower than the second interval.

Advantageous Effects of Invention

A flow path spacer having a good balance between shear stress and pressure loss can be provided according to the present disclosure.

DESCRIPTION OF EMBODIMENTS

Embodiments of the present disclosure will be described with reference to the drawings hereinafter. The present disclosure is not limited to the following embodiments.

Figure 1:
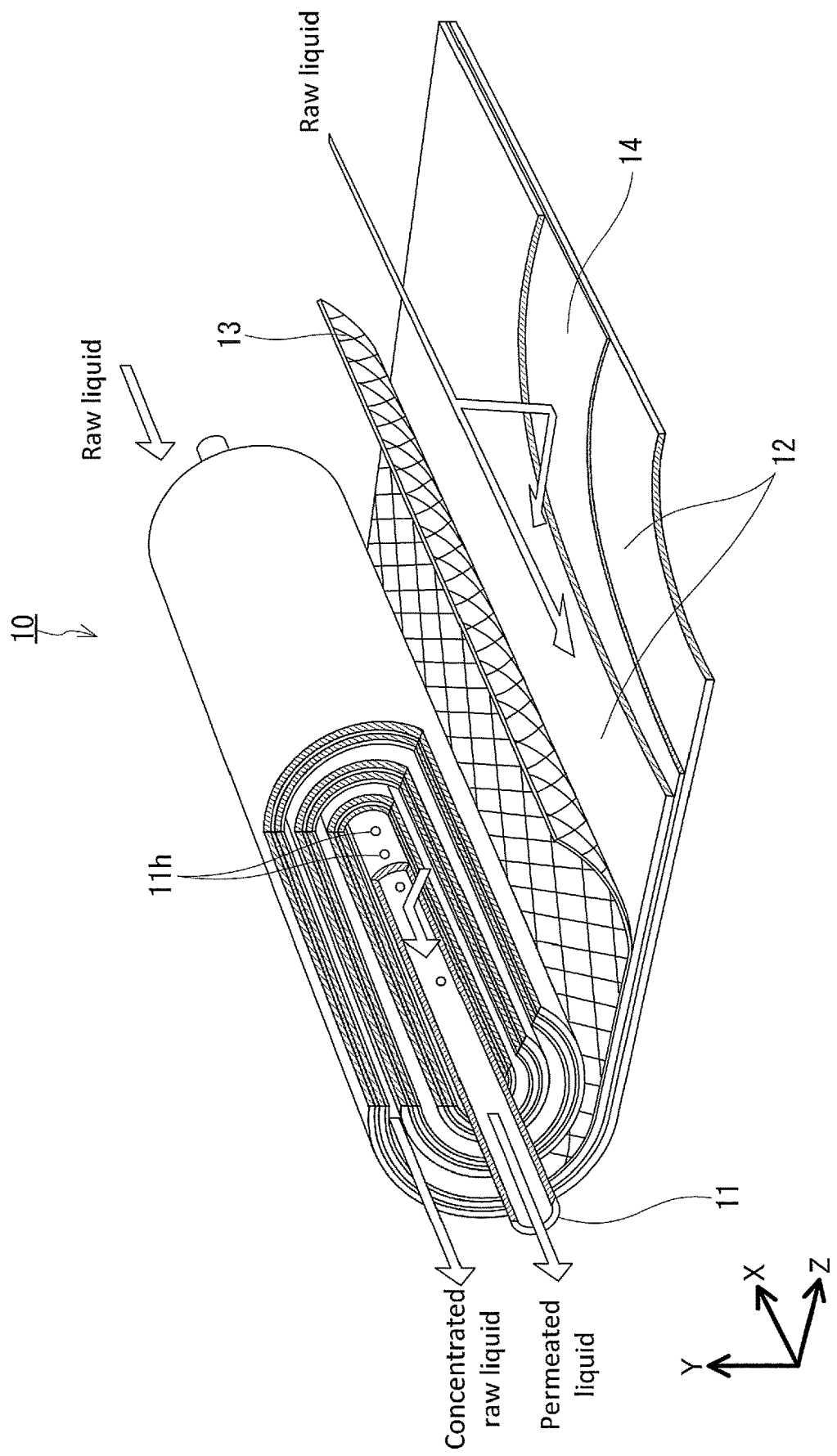
FIG. 1 is a perspective view showing a spiral membrane element according to one embodiment of the present disclosure.

FIG. 1 shows a partially developed view of a spiral membrane element according to one embodiment of the present disclosure. A spiral membrane element 10 (which may be referred to simply as "membrane element 10" hereinafter) includes a liquid collection tube 11, a plurality of separation membranes 12, a first flow path spacer 13, and a second flow path spacer 14.

Herein, an X direction is a direction parallel to the longitudinal direction (axis direction) of the liquid collection tube 11. A Y direction and a Z direction are each a radius direction of the liquid collection tube 11 and are mutually orthogonal.

The plurality of separation membranes 12 are layered, sealed on three sides to form a sack-like structure, and wound around the liquid collection tube 11. The first flow path spacer 13 is placed between the separation membranes 12 so as to be located outside the sack-like structure. The first flow path spacer 13 ensures a space as a raw liquid flow path between the separation membranes 12. The second flow path spacer 14 is placed between the separation membranes 12 so as to be located inside the sack-like structure. The second flow path spacer 14 ensures a space as a permeated liquid flow path between the separation membranes 12. The opening end of the sack-like structure is connected to the liquid collection tube 11 so that the permeated liquid flow path communicates to the liquid collection tube 11. The type of the raw liquid is not particularly limited. The raw liquid may be seawater, wastewater, or water used to produce pure water.

The liquid collection tube 11 serves to collect a permeated liquid having permeated each separation membrane 12 to direct the permeated liquid to the outside of the membrane element 10. The liquid collection tube 11 is typically a resin tube. The liquid collection tube 11 is provided along its longitudinal direction with a plurality of through holes 11h at given intervals. The permeated liquid flows into the liquid collection tube 11 through these through holes 11h.

Examples of the separation membrane 12 include a reverse osmosis membrane, a nanofiltration membrane, an ultrafiltration membrane, and a microfiltration membrane.

The first flow path spacer 13 is also called a raw liquid flow path spacer or a feed-side flow path member. The first flow path spacer 13 is a sheet having a mesh structure. The second flow path spacer 14 is also called a permeated liquid flow path spacer or a permeate-side flow path member. The second flow path spacer 14 also is a sheet having a mesh structure. The materials of the flow path spacers 13 and 14 are typically resin. The flow path spacer 13 may be produced by extrusion. The flow path spacer 13 can be produced by another shaping method such as 3D printing.

The membrane element 10 is used, for example, in a tube-shaped pressure container. Fed into the pressure container, the raw liquid to be treated flows into the raw liquid flow path from one end of the membrane element 10. The raw liquid is concentrated by filtering with the separation membrane 12. This produces a concentrated raw liquid and a permeated liquid. The concentrated raw liquid is discharged out of the membrane element 10 from the other end of the membrane element 10. The permeated liquid is discharged out of the membrane element 10 through the permeated liquid flow path and the liquid collection tube 11. The membrane element 10 produces the permeated liquid from which a solute, such as ions and salts, included in the raw liquid has been removed.

The first flow path spacer 13 included in the membrane element 10 has a good balance between shear stress and pressure loss. A reduction in pressure loss can decrease power necessary for a pump to feed the raw liquid and consequently can decrease energy needed to produce the permeated liquid. A reduction in pressure loss can also prevent telescoping of the membrane element 10. A sufficient shear stress acting on the separation membrane 12 reduces formation of a concentration polarization layer. This can ensure production of a sufficient amount of the permeated liquid. A high shear stress acting on the separation membrane 12 may also reduce occurrence of biofouling.

Figure 2:
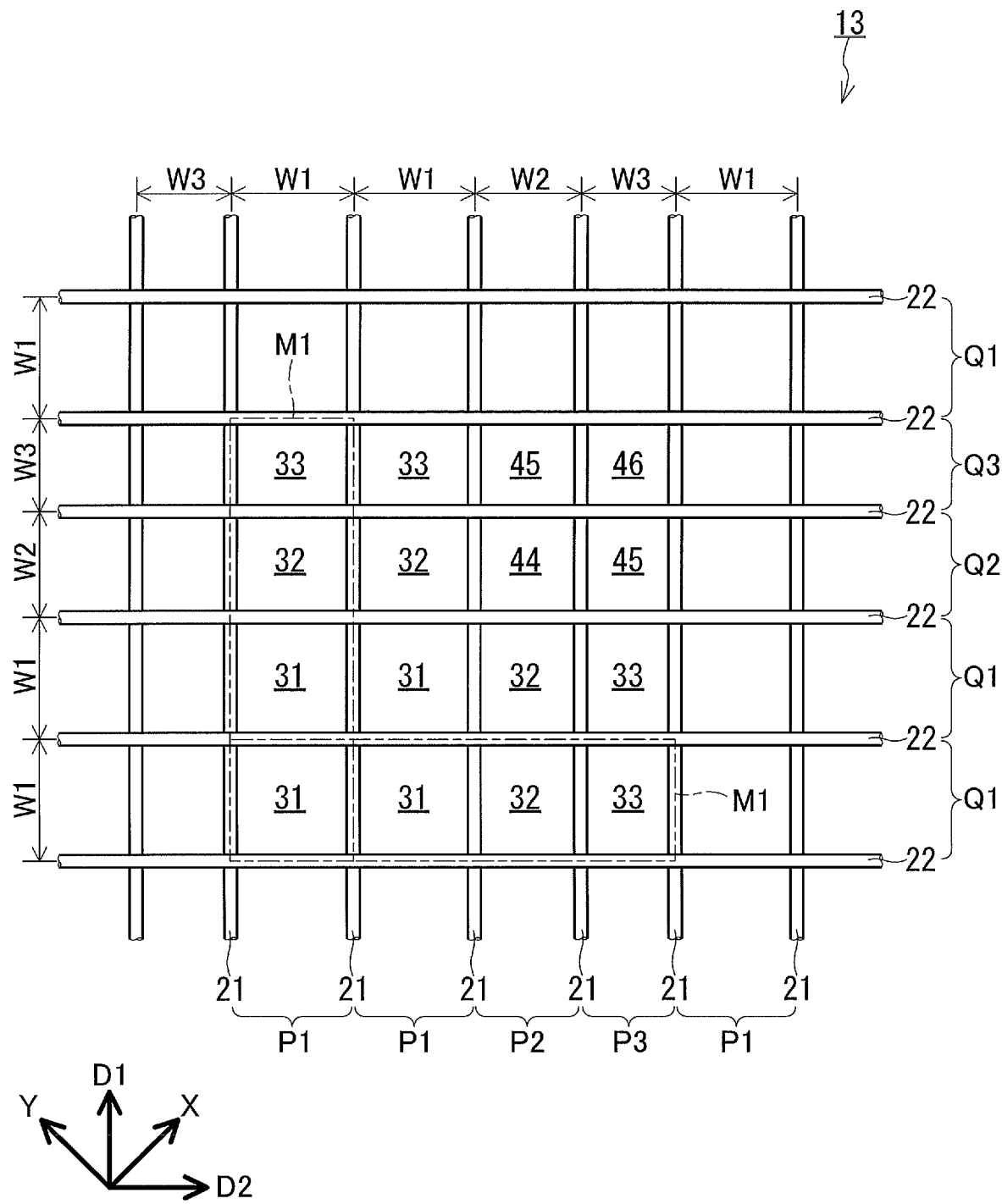
FIG. 2 is a partial plan view of a first flow path spacer included in the spiral membrane element shown in FIG. 1.

Next, the structure of the first flow path spacer 13 will be described in detail. FIG. 2 shows a plan view of a portion of the first flow path spacer 13 included in the spiral membrane element 10 shown in FIG. 1. The first flow path spacer 13 may be referred to simply as "spacer 13" hereinafter.

The spacer 13 of the present embodiment is a raw liquid flow path spacer to be placed in a raw liquid flow path. Raw liquid flow path spacers are required to have an ability to achieve both a high shear stress and a low pressure loss. A more sufficient benefit can be obtained by using the spacer 13 of the present embodiment as a raw liquid flow path spacer.

As shown in FIG. 2, the spacer 13 includes a plurality of first linear portions 21 and a plurality of second linear portions 22. The linear portions 21 and 22 are elongated portions formed of a resin material such as polyester, polyethylene, and polypropylene. The linear portions 21 and 22 have cross-sections having a shape of, for example, a circle. The linear portions 21 and 22 have a thickness (diameter) in the range of, for example, 0.2 to 1.0 mm. The linear portions 21 and 22 may be uniformly thick, or may be partially thin. The thickness of the spacer 13 is approximately equal to the sum of the thickness of the linear portion 21 and that of the linear portion 22.

The plurality of first linear portions 21 are disposed parallel to each other. The plurality of first linear portions 21 each extend in the first direction D1. The plurality of second linear portions 22 are disposed parallel to each other. The plurality of second linear portions 22 each extend in the second direction D2 inclined with respect to the first direction D1. In the present embodiment, the first direction D1 and the second direction D2 are mutually orthogonal directions. The plurality of first linear portions 21 and the plurality of second linear portions 22 intersect each other to form a mesh structure having a large number of opening portions. The first direction D1 and the second direction D2 may not be orthogonal to each other. The first linear portion 21 and the second linear portion 22 are not necessarily orthogonal to each other.

The first direction D1 and the second direction D2 are each a direction inclined with respect to the longitudinal direction (X direction) of the liquid collection tube 11. Specifically, the first direction D1 is inclined at 45° with respect to the longitudinal direction of the liquid collection tube 11. The second direction D2 is inclined at 45° with respect to the longitudinal direction of the liquid collection tube 11. In other words, the angle formed by the first direction D1 and the longitudinal direction of the liquid collection tube 11 is equal to the angle formed by the second direction D2 and the longitudinal direction of the liquid collection tube 11. Such a configuration makes it easy for shear stress to uniformly act on the whole surface of the separation membrane 12.

Figure 3:
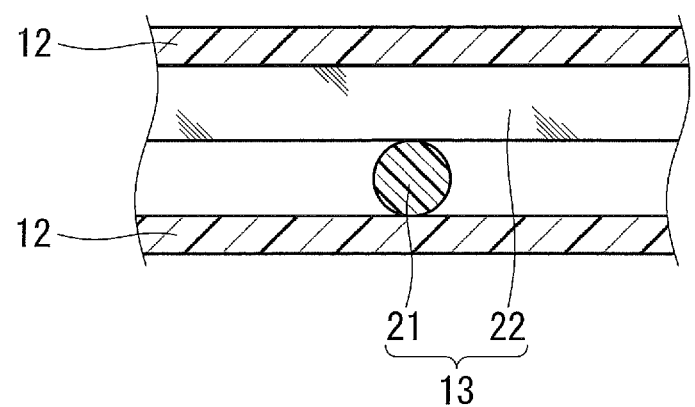
FIG. 3 is a partial cross-sectional view of a first flow path spacer placed between separation membranes.

In the present embodiment, the spacer 13 consists of the first linear portion 21 and the second linear portion 22. As shown in FIG. 3, the plurality of first linear portions 21 and the plurality of second linear portions 22 are layered in the thickness direction of the spacer 13 to form a double-layered structure. An interval (the width of the raw liquid flow path) between the separation membranes 12 is equal to the thickness of the spacer 13. The first linear portion 21 and the second linear portion 22 are bonded or fused together at their intersection. Such a configuration allows the flow of the raw liquid to serpentine in the thickness direction of the spacer 13 and makes it easy for shear stress to act on the surface of the separation membrane 12.

It should be noted that the plurality of first linear portions 21 and the plurality of second linear portions 22 may be woven. That is, the first linear portions 21 and the second linear portions 22 may alternate in position in the thickness direction of the spacer 13.

In the present embodiment, the first linear portions 21 are disposed at unequal intervals. There are a first pair P1, a second pair P2, and a third pair P3 in the spacer 13. For the first pair P1, the first linear portions 21 adjacent to each other are disposed at a first interval W1. For the second pair P2, the first linear portions 21 adjacent to each other are disposed at a second interval W2 narrower than the first interval W1. For the third pair P3, the first linear portions 21 adjacent to each other are disposed at a third interval W3 narrower than the second interval W2. Such a configuration makes it possible to balance shear stress and pressure loss.

In one example, the first interval W1 may be in the range of 4.0 mm or more and 4.5 mm or less. The second interval W2 may be in the range of 3.2 mm or more and less than 4.0 mm. The third interval W3 may be in the range of 2.5 mm or more and less than 3.2 mm.

Herein, an interval between linear portions refers to the shortest distance measured between the central lines of the linear portions when the spacer 13 is viewed in plan.

In the present embodiment, the first pair P1, the second pair P2, and the third pair P3 are included in the plurality of first linear portions 21. That is, each of the first pair P1, the second pair P2, and the third pair P3 is a pair of the first linear portions 21. Such a configuration makes it easy to balance shear stress and pressure loss in the second direction D2 in which the first linear portions 21 are arranged side by side.

The spacer 13 includes a first opening portion 31 having the first interval W1, a second opening portion 32 having the second interval W2, and a third opening portion 33 having the third interval W3. The first opening portion 31, the second opening portion 32, and the third opening portion 33 are arranged in this order in the second direction D2. Specifically, the first opening portion 31 is a square opening portion defined by the first intervals W1. The second opening portion 32 is a rectangular opening portion defined by the first interval W1 and the second interval W2. The third opening portion 33 is a rectangular opening portion defined by the first interval W1 and the third interval W3. Such a configuration makes it easy to balance shear stress and pressure loss in the second direction D2.

The opening area of the first opening portion 31 is larger than the opening area of the second opening portion 32. The opening area of the second opening portion 32 is larger than the opening area of the third opening portion 33.

A mesh unit M1 including the first opening portion 31, the second opening portion 32, and the third opening portion 33 is repeated in the second direction D2. In the present embodiment, the mesh unit M1 includes two first opening portions 31. In the mesh unit M1, the first opening portion 31, the first opening portion 31, the second opening portion 32, and the third opening portion 33 are arranged in this order. The repetition of the mesh unit M1 can repeatedly achieve a balancing effect on shear stress and pressure loss in the second direction D2.

In the present embodiment, as is the case for the first linear portions 21, the second linear portions 22 also are disposed at unequal intervals. There are a first pair Q1, a second pair Q2, and a third pair Q3 in the spacer 13. For the first pair Q1, the second linear portions 22 adjacent to each other are disposed at the first interval W1. For the second pair Q2, the second linear portions 22 adjacent to each other are disposed at the second interval W2 narrower than the first interval W1. For the third pair Q3, the second linear portions 22 adjacent to each other are disposed at the third interval W3 narrower than the second interval W2. The first pair P1, the second pair P2, and the third pair P3 are included in the plurality of first linear portions 21, and the first pair Q1, the second pair Q2, and the third pair Q3 are included in the plurality of second linear portions 22. That is, each of the first pair P1, the second pair P2, and the third pair P3 is a pair of the first linear portions 21. Each of the first pair Q1, the second pair Q2, and the third pair Q3 is a pair of the second linear portions 22. Such a configuration makes it easy to balance shear stress and pressure loss in both the first direction D1 and the second direction D2.

An arrangement pattern of the first linear portions 21 in the second direction D2 coincides with an arrangement pattern of the second linear portions 22 in the first direction D1. As the first linear portions 21 and the second linear portions 22 are disposed in the same pattern, the first opening portion 31, the second opening portion 32, and the third opening portion 33 are arranged in this order in each of the first direction D1 and the second direction D2. Such a configuration makes it easy to balance shear stress and pressure loss in both the first direction D1 and the second direction D2.

The mesh unit M1 including the first opening portion 31, the second opening portion 32, and the third opening portion 33 is repeated in each of the first direction D1 and the second direction D2. The repetition of the mesh unit M1 can repeatedly achieve a balancing effect on shear stress and pressure loss in both the first direction D1 and the second direction D2.

The spacer 13 of the present embodiment further includes opening portions 44 to 46 in addition to the first opening portion 31, the second opening portion 32, and the third opening portion 33. The opening portion 44 is a square opening portion defined by the second intervals W2. The opening portion 45 is a rectangular opening portion defined by the second interval W2 and the third interval W3. The opening portion 46 is a square opening portion defined by the third intervals W3. The opening area of the opening portion 44 is larger than the opening area of the opening portion 45. The opening area of the opening portion 45 is larger than the opening area of the opening portion 46. The first opening portion 31, the opening portion 44, and the opening portion 46 are square opening portions each having a diagonal line parallel to the longitudinal direction of the liquid collection tube 11. The first opening portion 31, the first opening portion 31, the opening portion 44, and the opening portion 46 are arranged in this order along the longitudinal direction of the liquid collection tube 11 (predetermined direction). The opening area of the first opening portion 31 is larger than the opening area of the opening portion 44, and the opening area of the opening portion 44 is larger than the opening area of the opening portion 46. Assuming that one mesh unit is composed of 16 (4×4) opening portions, the mesh unit is repeated along the first direction D1 and the second direction D2. Such a configuration makes it possible to balance shear stress and pressure loss.

In the spacer 13, the position of the second opening portion 32 and that of the third opening portion 33 may be switched. That is, the first opening portion 31, the third opening portion 33, and the second opening portion 32 may be arranged in this order along the first direction D1. The first opening portion 31, the third opening portion 33, and the second opening portion 32 may be arranged in this order along the second direction D2. The first opening portion 31, the second opening portion 32, and the third opening portion 33 may be arranged in any order.

The mesh unit M1 may include two second opening portions 32 and two third opening portions 33. For example, the mesh unit M1 may include the first opening portion 31, the first opening portion 31, the second opening portion 32, the second opening portion 32, the third opening portion 33, and third opening portion 33.

The mesh unit M1 is not necessarily repeated, either. The first opening portion 31, the second opening portion 32, and the third opening portion 33 may be arranged randomly. A structure composed of a combination of a large opening portion and a small opening portion makes it possible to balance shear stress and pressure loss.

Flow path spacers according to some modifications will be described hereinafter. The elements common between the embodiment and the modifications are denoted by the same reference characters, and the descriptions of such elements may be omitted. That is, the description of each of the embodiment and the modifications is applicable to the others, unless there is technical inconsistency. The configurations of the embodiment and the modifications may be combined with each other, unless there is technical inconsistency.

Figure 4:
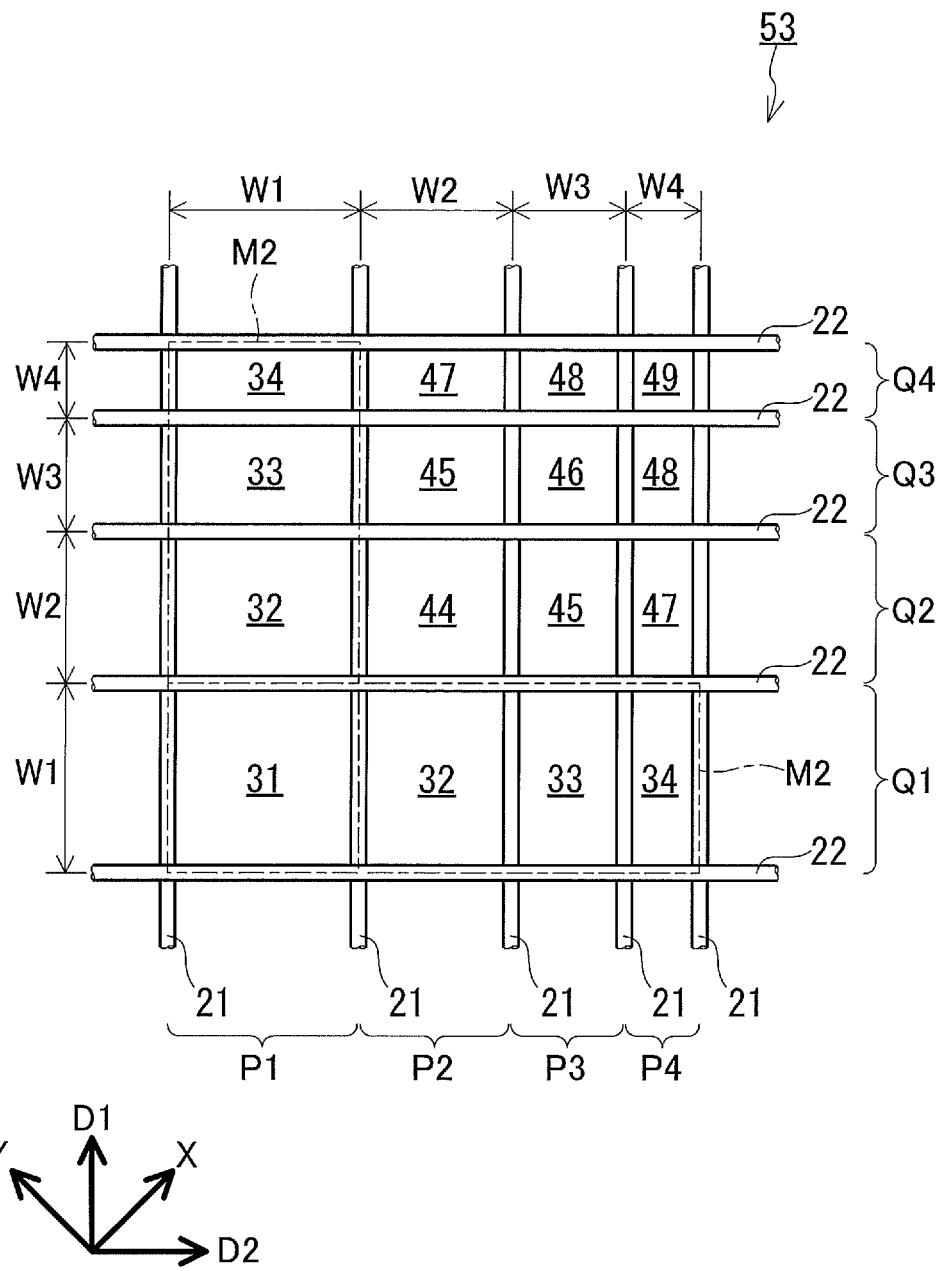
FIG. 4 is a partial plan view of a first flow path spacer according to a modification 1.

FIG. 4 shows a plan view of a portion of a first flow path spacer 53 according to a modification 1. In the spacer 53, there is further a fourth pair P4 in addition to the first pair P1, the second pair P2, and the third pair P3. For the fourth pair P4, the first linear portions 21 adjacent to each other are disposed at a fourth interval W4 narrower than the third interval W3. Such a configuration also makes it possible to balance shear stress and pressure loss. That is, the upper limit of the number of pairs each having a different interval is not particularly limited.

In one example, the first interval W1 may be in the range of 4.0 mm or more and 4.5 mm or less. The second interval W2 may be in the range of 3.5 mm or more and less than 4.0 mm. The third interval W3 may be in the range of 3.1 mm or more and less than 3.5 mm. The fourth interval W4 may be in the range of 2.5 mm or more and less than 3.1 mm.

In the present modification, the first pair P1, the second pair P2, the third pair P3, and the fourth pair P4 are included in the plurality of first linear portions 21. That is, each of the first pair P1, the second pair P2, the third pair P3, and fourth pair P4 is a pair of the first linear portions 21. Such a configuration makes it easy to balance shear stress and pressure loss in the second direction D2 in which the first linear portions 21 are arranged side by side.

The spacer 53 includes a fourth opening portion 34 having the fourth interval W4 in addition to the first opening portion 31, the second opening portion 32, and the third opening portion 33. The first opening portion 31, the second opening portion 32, the third opening portion 33, and the fourth opening portion 34 are arranged in this order in the second direction D2. The fourth opening portion 34 is a rectangular opening portion defined by the first interval W1 and the fourth interval W4. Such a configuration makes it easy to balance shear stress and pressure loss in the second direction D2.

The opening area of the fourth opening portion 34 is smaller than the opening area of the third opening portion 33.

A mesh unit M2 including the first opening portion 31, the second opening portion 32, the third opening portion 33, and the fourth opening portion 34 is repeated in the second direction D2. The repetition of the mesh unit M2 can repeatedly achieve a balancing effect on shear stress and pressure loss in the second direction D2.

In the present modification, as is the case for the first linear portions 21, the second linear portions 22 also are disposed at unequal intervals. In the spacer 53, there is a fourth pair Q4 in addition to the first pair Q1, the second pair Q2, and the third pair Q3. For the fourth pair Q4, the second linear portions 22 adjacent to each other are disposed at a fourth interval W4 narrower than the third interval W3. The first pair P1, the second pair P2, the third pair P3, and the fourth pair P4 are included in the plurality of first linear portions 21, and the first pair Q1, the second pair Q2, the third pair Q3, and the fourth pair Q4 are included in the plurality of second linear portions 22. That is, each of the first pair P1, the second pair P2, the third pair P3, and the fourth pair P4 is a pair of the first linear portions 21. Each of the first pair Q1, the second pair Q2, the third pair Q3, and the fourth pair Q4 is a pair of the second linear portions 22. Such a configuration makes it easy to balance shear stress and pressure loss in both the first direction D1 and the second direction D2.

The arrangement pattern of the first linear portions 21 in the second direction D2 coincides with the arrangement pattern of the second linear portions 22 in the first direction D1. As the first linear portions 21 and the second linear portions 22 are disposed in the same pattern, the first opening portion 31, the second opening portion 32, the third opening portion 33, and the fourth opening portion 34 are arranged in this order in each of the first direction D1 and the second direction D2. Such a configuration makes it easy to balance shear stress and pressure loss in both the first direction D1 and the second direction D2.

The mesh unit M2 including the first opening portion 31, the second opening portion 32, the third opening portion 33, and the fourth opening portion 34 is repeated in each of the first direction D1 and the second direction D2. The repetition of the mesh unit M2 can repeatedly achieve a balancing effect on shear stress and pressure loss in both the first direction D1 and the second direction D2.

The spacer 53 of the present modification further includes opening portions 44 to 49 in addition to the first opening portion 31, the second opening portion 32, the third opening portion 33, and the fourth opening portion 34. The configurations of the opening portions 44 to 46 are as described previously. The opening portion 47 is a rectangular opening portion defined by the second interval W2 and the fourth interval W4. The opening portion 48 is a rectangular opening portion defined by the third interval W3 and the fourth interval W4. The opening portion 49 is a square opening portion defined by the fourth intervals W4. The opening area of the opening portion 47 is larger than the opening area of the opening portion 48. The opening area of the opening portion 48 is larger than the opening area of the opening portion 49. The first opening portion 31, the opening portion 44, the opening portion 46, and the opening portion 49 are square opening portions each having a diagonal line parallel to the longitudinal direction of the liquid collection tube 11. The first opening portion 31, the opening portion 44, the opening portion 46, and the opening portion 49 are arranged in this order along the longitudinal direction of the liquid collection tube 11. Assuming that one mesh unit is composed of 16 (4×4) opening portions, the mesh unit is repeated along the first direction D1 and the second direction D2. Such a configuration makes it possible to balance shear stress and pressure loss.

In the spacer 53, the position of the second opening portion 32 and that of the third opening portion 33 may be switched. For example, the first opening portion 31, the third opening portion 33, and the second opening portion 32 may be arranged in this order along the first direction D1. The first opening portion 31, the third opening portion 33, and the second opening portion 32 may be arranged in this order along the second direction D2. Moreover, the position of the third opening portion 33 and that of the fourth opening portion 34 may be switched. The position of the second opening portion 32 and that of the fourth opening portion 34 may be switched. The first opening portion 31, the second opening portion 32, the third opening portion 33, and the fourth opening portion 34 may be arranged in any order.

The mesh unit M2 is not necessarily repeated, either. The first opening portion 31, the second opening portion 32, the third opening portion 33, and the fourth opening portion 34 may be arranged randomly. A structure composed of a combination of a large opening portion and a small opening portion makes it possible to balance shear stress and pressure loss.

Figure 5:
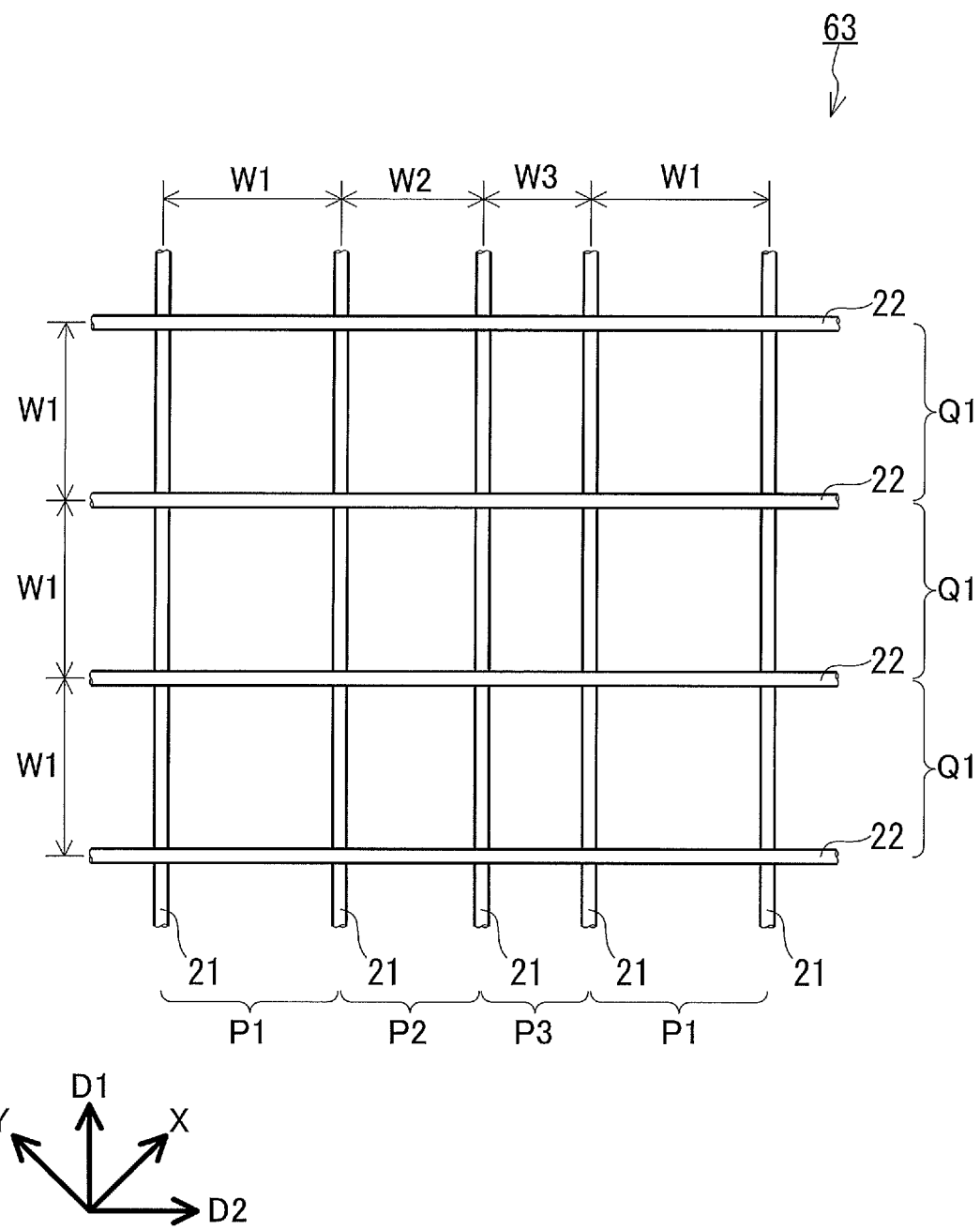
FIG. 5 is a partial plan view of a first flow path spacer according to a modification 2.

FIG. 5 shows a plan view of a portion of a flow path spacer 63 according to a modification 2. In the spacer 63 of the present modification, the first linear portions 21 are disposed at unequal intervals. The second linear portions 22 are disposed at equal intervals. The first pair P1, the second pair P2, and the third pair P3 are included in the plurality of first linear portions 21. Only the first pair Q1 having the first interval W1 is included in the plurality of second linear portions 22.

Figure 6:
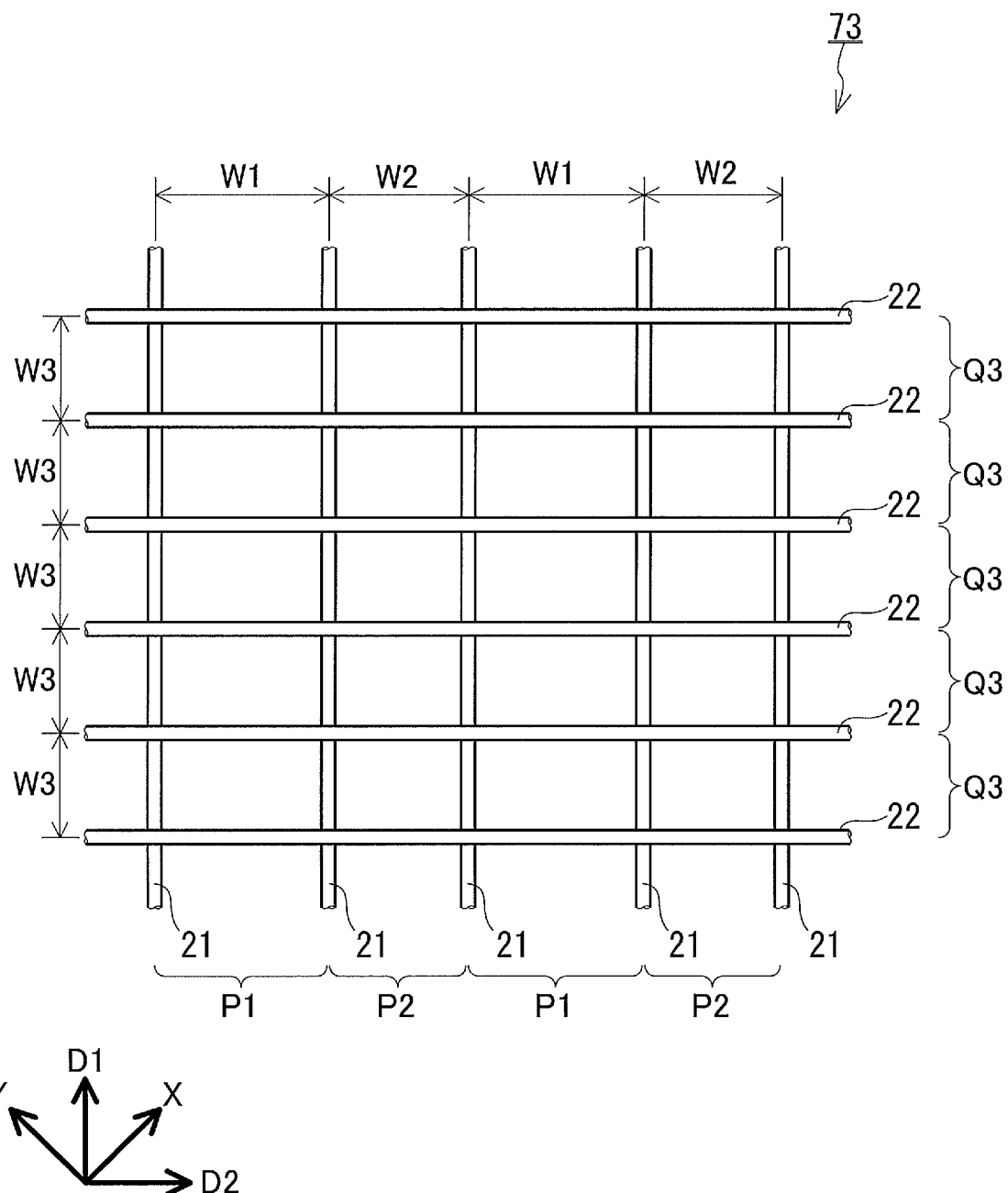
FIG. 6 is a partial plan view of a first flow path spacer according to a modification 3.

FIG. 6 shows a plan view of a portion of a flow path spacer 73 according to a modification 3. In the spacer 73 of the present modification, the first linear portions 21 are disposed at unequal intervals. The second linear portions 22 are disposed at equal intervals. The first pair P1 and the second pair P2 are included in the plurality of first linear portions 21. Only the third pair Q3 having the third interval W3 is included in the plurality of second linear portions 22.

Figure 7:
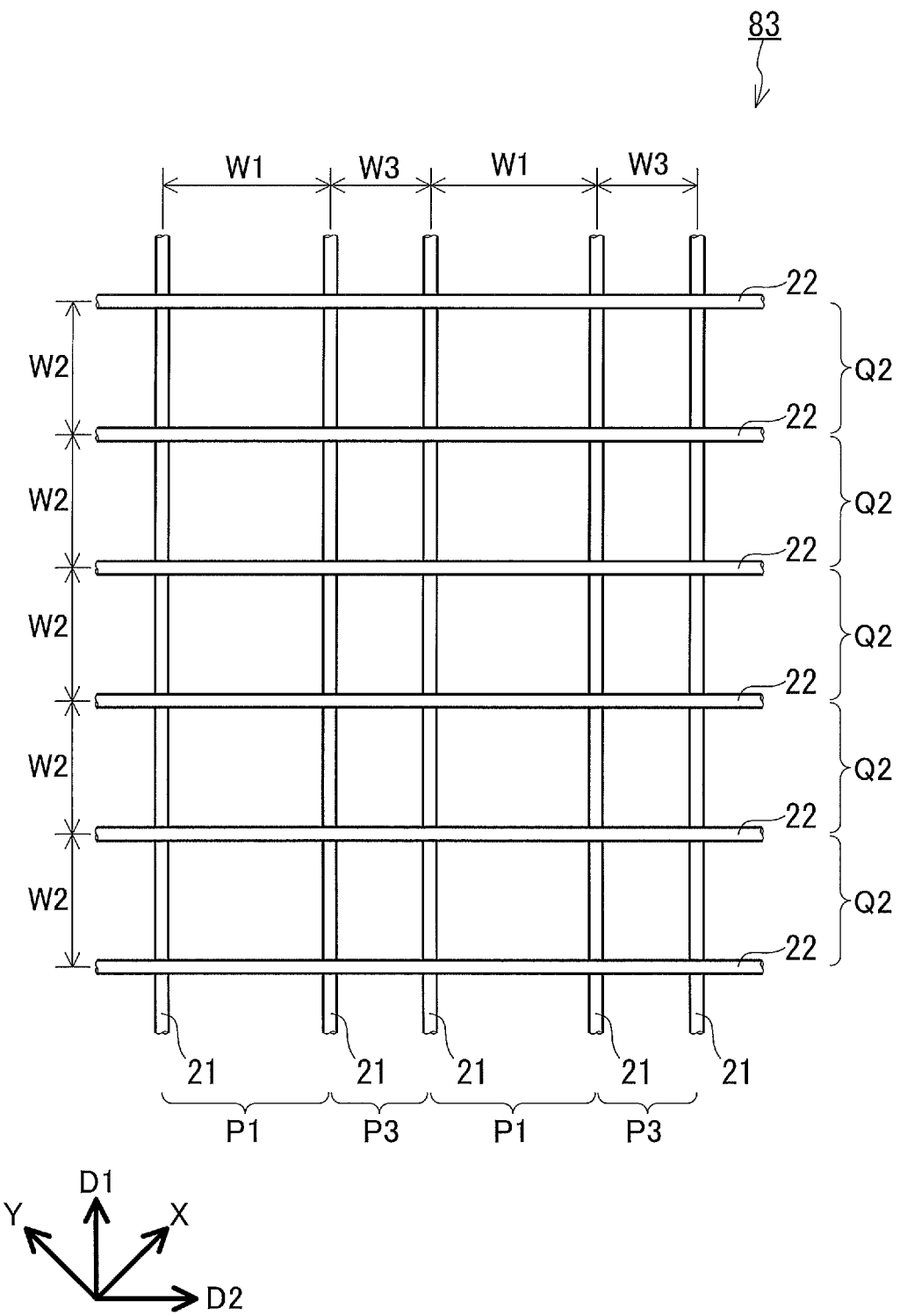
FIG. 7 is a partial plan view of a first flow path spacer according to a modification 4.

FIG. 7 shows a plan view of a portion of a flow path spacer 83 according to a modification 4. In the spacer 83 of the present modification, the first linear portions 21 are disposed at unequal intervals. The second linear portions 22 are disposed at equal intervals. The first pair P1 and the third pair P3 are included in the plurality of first linear portions 21. Only the second pair Q2 having the second interval W2 is included in the plurality of second linear portions 22.

Figure 8:
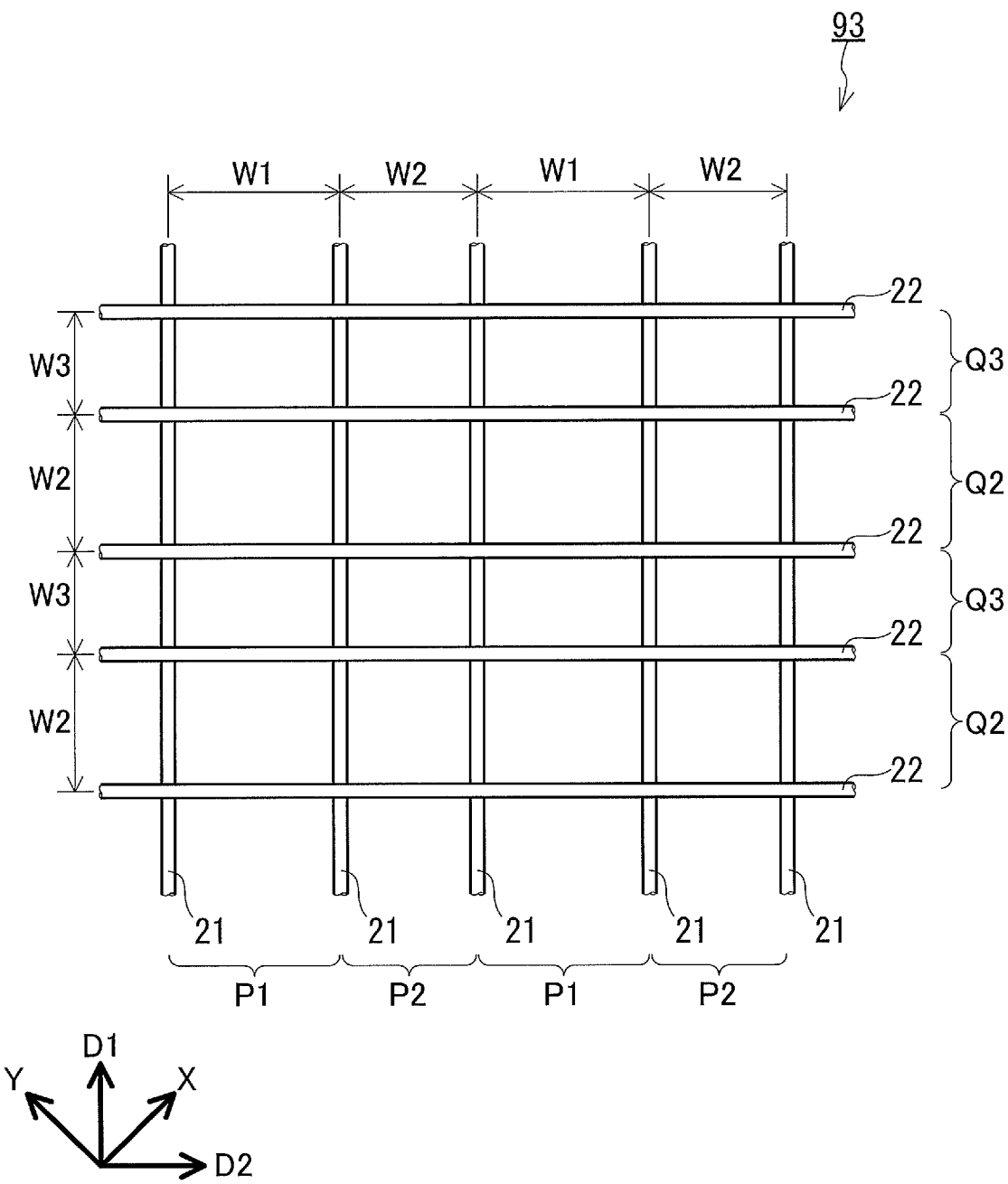
FIG. 8 is a partial plan view of a first flow path spacer according to a modification 5.

FIG. 8 shows a plan view of a portion of a flow path spacer 93 according to a modification 5. In the spacer 93 of the present modification, the first linear portions 21 are disposed at unequal intervals. The second linear portions 22 are disposed at unequal intervals. The first pair P1 and the second pair P2 are included in the plurality of first linear portions 21. The second pair Q2 and the third pair Q3 are included in the plurality of second linear portions 22.

As can be understood from the modifications shown in FIGS. 5 to 8, the arrangement pattern of the first linear portions 21 does not necessarily coincides with the arrangement pattern of the second linear portions 22. The arrangement pattern of the first linear portions 21 in the second direction D2 may be different from the arrangement pattern of the second linear portions 22 in the first direction D1. As long as the number of pairs each having a different interval is 3 or more, there may be the first pair, the second pair, and the third pair only in the plurality of first linear portions 21 or only in the plurality of second linear portions 22. The sum of the number of types of pairs included in the plurality of first linear portions 21 and the number of types of pairs included in the plurality of second linear portions 22 may be 3 or more. The first pair is at least one selected from a pair of the first linear portions 21 adjacent to each other and disposed at the first interval W1 and a pair of the second linear portions 22 adjacent to each other and disposed at the first interval W1. The second pair is at least one selected from a pair of the first linear portions 21 adjacent to each other and disposed at the second interval W2 and a pair of the second linear portions 22 adjacent to each other and disposed at the second interval W2. The third pair is at least one selected from a pair of the first linear portions 21 adjacent to each other and disposed at the third interval W3 and a pair of the second linear portions 22 adjacent to each other and disposed at the third interval W3.

Figure 9:
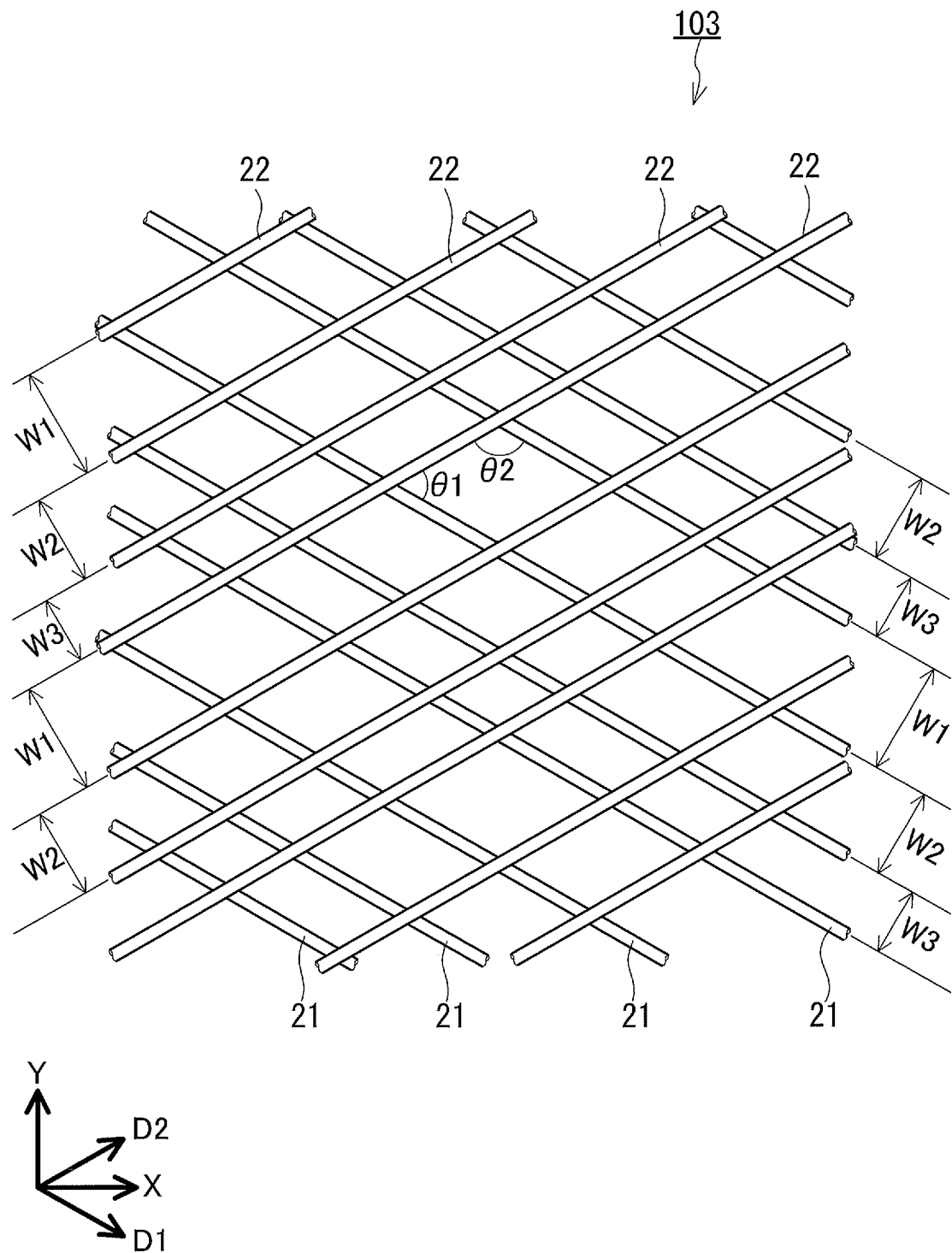
FIG. 9 is a partial plan view of a first flow path spacer according to a modification 6.

FIG. 9 shows a plan view of a portion of a flow path spacer 103 according to a modification 6. In the spacer 103 of the present modification, the first linear portion 21 extends in the first direction D1. The second linear portion 22 extends in the second direction D2. The first direction D1 is not orthogonal to the second direction D2. Angles formed by the first direction D1 and the second direction D2 include an acute angle θ1 and an obtuse angle θ2. In the spacer 103, each opening portion is in the shape of a parallelogram having the acute angle θ1 and the obtuse angle θ2 as internal angles. In the present modification, the first direction D1 is a direction inclined at 30° with respect to the longitudinal direction (X direction) of the liquid collection tube 11. The second direction D2 is a direction inclined at −30° with respect to the longitudinal direction (X direction) of the liquid collection tube 11. The acute angle θ1 is 60°. The obtuse angle θ2 is 120°. The spacer 103 of the present modification also has a good balance between shear stress and pressure loss. In the spacer of the present disclosure, the first linear portion 21 and the second linear portion 22 are not necessarily orthogonal to each other.

EXAMPLES

Shear stress acting on a separation membrane and a pressure loss were examined by computer simulation for membrane elements including first flow path spacers. The simulation was carried out under the following conditions.

Fluid analysis software: Fluent manufactured by ANSYS Japan K.K.

Thickness of linear portion: 0.43 mm

Total thickness of spacer: 0.84 mm (the 0.02-mm reduction is attributed to fusion)

Water flow rate: 11.3 cm/sec

Figure 10:
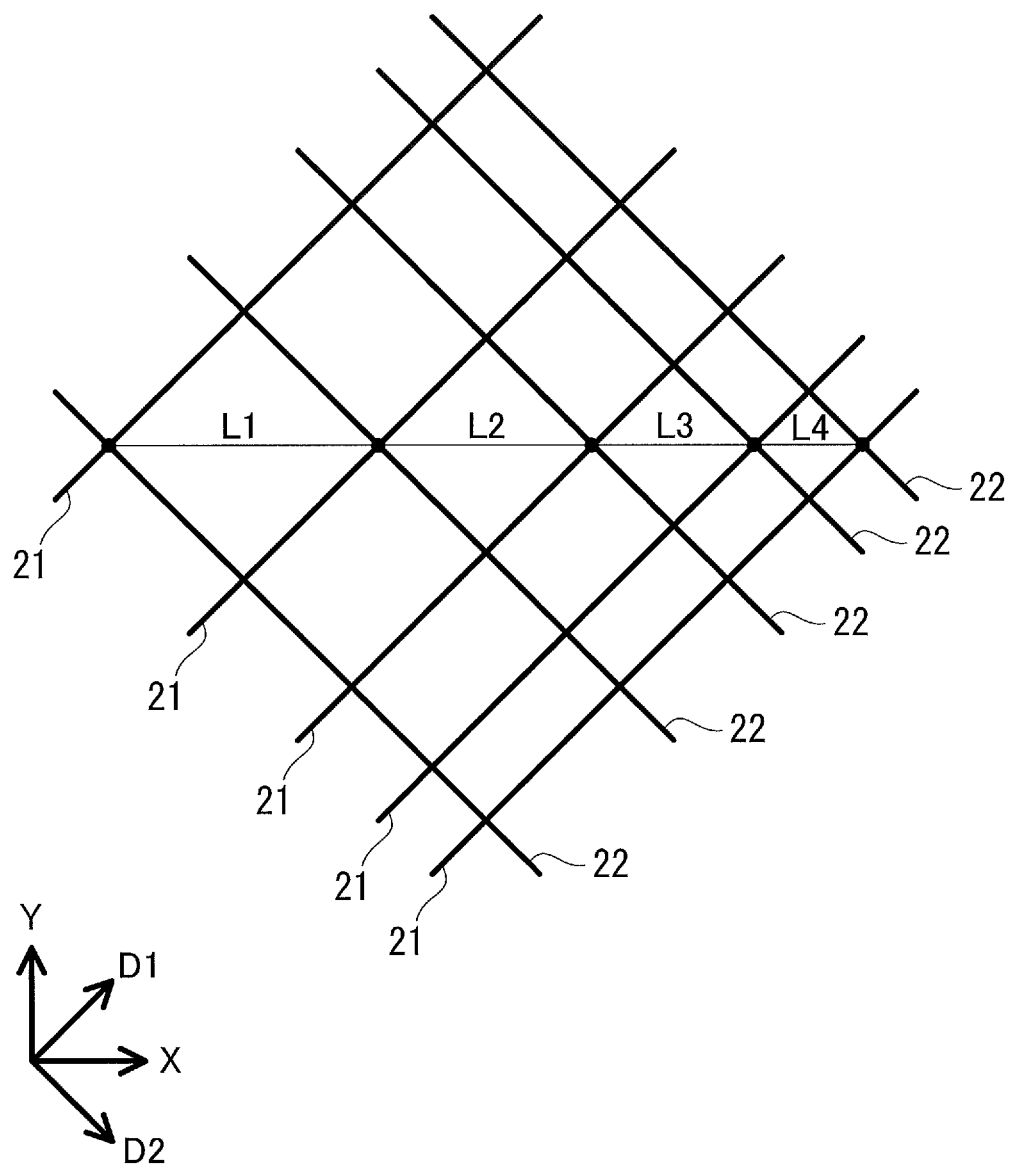
FIG. 10 shows a model of a flow path spacer used for simulation.

As shown in FIG. 10, the first linear portions 21 and the second linear portions 22 are mutually orthogonal in the spacers for which the simulation was carried out. The arrangement pattern of the first linear portions 21 in the second direction D2 coincides with the arrangement pattern of the second linear portions 22 in the first direction D1. Diagonal line lengths L1 to L4 of opening portions were adjusted to the values in Table 1 by changing the intervals between the linear portions. In Sample 1, the number of pairs each having a different interval was adjusted to "3". In Sample 2, the number of pairs each having a different interval was adjusted to "4". Sample 3 is a conventional spacer having only square opening portions with a diagonal line length of 5.0 mm. The term "diagonal line length" refers to the length of a diagonal line of a quadrilateral defined by the central lines of a pair of the first linear portions 21 and the central lines of a pair of the second linear portions 22 when the spacer 13 is viewed in plan. The term "average shear stress" refers to the average of shear stress applied to the surface of a separation membrane. The term "pressure loss" refers to a pressure loss per 132 mm length of a membrane element.

TABLE 1

|  | Diagonal line length (mm) of opening portion | | | | Average shear stress (Pa) | Pressure loss (kPa) |
| --- | --- | --- | --- | --- | --- | --- |
|  | L1 | L2 | L3 | L4 | | |
| Sample 1 | 6.0 | 6.0 | 4.8 | 4.2 | 1.4 | 1.259 |
| Sample 2 | 6.0 | 5.4 | 4.8 | 4.2 | 1.4 | 1.302 |
| Sample 3 | 5.0 | 5.0 | 5.0 | 5.0 | 1.4 | 1.349 |

The spacers of Sample 1 and Sample 2 not only exhibited a lower pressure loss than that of the spacer of Sample 3 but also exhibited an average shear stress equivalent to that of the spacer of Sample 3. The spacers of Sample 1 and Sample 2 had a very good balance between shear stress and pressure loss.

The same simulation was carried out for samples corresponding to the modifications as well as for the samples shown in Table 1. It has been confirmed thereby that the desired effect can be obtained.

INDUSTRIAL APPLICABILITY

The technique of the present disclosure is useful for spiral membrane elements. Spiral membrane elements may be used in various applications such as desalination of seawater, production of pure water, wastewater treatment, manufacture of medicinal chemicals, manufacture of foods, and separation of active ingredients.

The invention claimed is:

1. A flow path spacer used between separation membranes wound around a liquid collection tube of a spiral membrane element, the flow path spacer comprising:
    a plurality of first linear portions each extending in a first direction; and
    a plurality of second linear portions each extending in a second direction inclined with respect to the first direction, wherein
    a first pair, a second pair, and a third pair are present,
    the first pair is a pair of the first linear portions adjacent to each other and disposed at a first interval for the first linear portions and optionally a pair of the second linear portions adjacent to each other and disposed at a first interval for the second linear portions,
    the second pair is a pair of the first linear portions adjacent to each other and disposed at a second interval for the first linear portions narrower than the first interval for the first linear portions and optionally a pair of the second linear portions adjacent to each other and disposed at a second interval for the second linear portions narrower than the first interval for the second linear portions,
    the third pair is a pair of the first linear portions adjacent to each other and disposed at a third interval for the first linear portions narrower than the second interval for the first linear portions and optionally a pair of the second linear portions adjacent to each other and disposed at a third interval for the second linear portions narrower than the second interval for the second linear portions,
    the flow path spacer comprises a first opening portion having the first interval for the first linear portions, a second opening portion having the second interval for the first linear portions, and a third opening portion having the third interval for the first linear portions,
    the first opening portion, the second opening portion, and the third opening portion are arranged in this order in the second direction, and
    a mesh unit comprising the first opening portion, the second opening portion, and the third opening portion is repeated in the second direction.

2. The flow path spacer according to claim 1, wherein the first pair, the second pair, and the third pair are also present in the plurality of second linear portions.

3. The flow path spacer according to claim 2, wherein the first opening portion, the second opening portion, and the third opening portion are arranged in this order in each of the first direction and the second direction.

4. The flow path spacer according to claim 3, wherein a mesh unit comprising the first opening portion, the second opening portion, and the third opening portion is repeated in each of the first direction and the second direction.

5. The flow path spacer according to claim 1, wherein there is further a fourth pair, and
    the fourth pair is at least one selected from a pair of the first linear portions adjacent to each other and disposed at a fourth interval narrower than the third interval and a pair of the second linear portions adjacent to each other and disposed at the fourth interval narrower than the third interval.

6. The flow path spacer according to claim 5, wherein the first pair, the second pair, the third pair, and the fourth pair are present in the plurality of first linear portions.

7. The flow path spacer according to claim 6, wherein the flow path spacer further comprises a fourth opening portion having the fourth interval, and
    the first opening portion, the second opening portion, the third opening portion, and the fourth opening portion are arranged in this order in the second direction.

8. The flow path spacer according to claim 7, wherein a mesh unit comprising the first opening portion, the second opening portion, the third opening portion, and the fourth opening portion is repeated in the second direction.

9. The flow path spacer according to claim 5, wherein the first pair, the second pair, the third pair, and the fourth pair are present in both the plurality of first linear portions and the plurality of second linear portions.

10. The flow path spacer according to claim 9, wherein the flow path spacer further comprises a fourth opening portion having the fourth interval, and
    the first opening portion, the second opening portion, the third opening portion, and the fourth opening portion are arranged in this order in each of the first direction and the second direction.

11. The flow path spacer according to claim 10, wherein a mesh unit comprising the first opening portion, the second opening portion, the third opening portion and the fourth opening portion is repeated in each of the first direction and the second direction.

12. The flow path spacer according to claim 1, wherein the plurality of first linear portions and the plurality of second linear portions form a double-layered structure in the thickness direction of the flow path spacer.

13. The flow path spacer according to claim 1, wherein the first direction and the second direction are mutually orthogonal directions.

14. The flow path spacer according to claim 1, wherein angles formed by the first direction and the second direction comprise an acute angle and an obtuse angle.

15. The flow path spacer according to claim 1, wherein the first direction and the second direction are each a direction inclined with respect to the longitudinal direction of the liquid collection tube.

16. The flow path spacer according to claim 1, that is configured to be a flow path spacer to be placed in a raw liquid flow path.

17. A spiral membrane element comprising the flow path spacer according to claim 1.

* * * * *